(12) United States Patent
Wu et al.

(10) Patent No.: US 10,215,908 B1
(45) Date of Patent: Feb. 26, 2019

(54) OPTICAL WAVEGUIDE AND OPTICAL DEVICE

(71) Applicant: BOE TECHNOLOGY GROUP CO., LTD., Beijing (CN)

(72) Inventors: Naifu Wu, Beijing (CN); Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/960,802

(22) Filed: Apr. 24, 2018

(30) Foreign Application Priority Data

Aug. 31, 2017 (CN) .......................... 2017 1 0775099

(51) Int. Cl.
*F21V 8/00* (2006.01)
*G02B 27/01* (2006.01)

(52) U.S. Cl.
CPC ......... *G02B 6/0056* (2013.01); *G02B 6/0055* (2013.01); *G02B 6/0065* (2013.01); *G02B 27/0172* (2013.01); *G02B 2027/0123* (2013.01); *G02B 2027/0178* (2013.01)

(58) Field of Classification Search
CPC . G02B 6/0055; G02B 6/0056; G02B 27/0172
See application file for complete search history.

(56) References Cited

U.S. PATENT DOCUMENTS

| 6,631,031 | B2 * | 10/2003 | Lee | ........................ F21V 9/14 |
| | | | | 359/485.03 |
| 7,570,325 | B2 * | 8/2009 | Chang | ............... G02F 1/133512 |
| | | | | 349/104 |
| 7,876,407 | B2 * | 1/2011 | Koma | ............... G02F 1/133371 |
| | | | | 349/114 |
| 9,612,403 | B2 * | 4/2017 | Abovitz | .................. G02B 6/34 |
| 2004/0125292 | A1 * | 7/2004 | Maeda | ............... G02F 1/133555 |
| | | | | 349/117 |
| 2007/0085948 | A1 * | 4/2007 | Kim | .................. G02F 1/133632 |
| | | | | 349/114 |
| 2016/0231566 | A1 * | 8/2016 | Levola | ............... G02B 27/0172 |

\* cited by examiner

*Primary Examiner* — Daniel Petkovsek
(74) *Attorney, Agent, or Firm* — Nath, Goldberg & Meyer; Joshua B. Goldberg; Daniel Bissing

(57) ABSTRACT

The present disclosure provides an optical waveguide and an optical device. The optical waveguide includes a first total reflection surface, a second total reflection surface, at least two transflective films, a first phase retardation film, and a second phase retardation film, each of the transflective films being configured to completely transmit light having a first polarization state, half transmit and half reflect light having a second polarization state, so that reflected light having the second polarization state propagates through the second phase retardation film and the second total reflection surface toward a target, thereby ensuring a transmission angle of the light output to the outside of the optical waveguide to be sufficiently small, which effectively solves the problem of the stray light, ensures the imaging quality, and improves the user's experience.

20 Claims, 6 Drawing Sheets

OPTICAL WAVEGUIDE AND OPTICAL DEVICE

CROSS-REFERENCE TO RELATED APPLICATIONS

The present disclosure claims the priority of Chinese Patent Application No. 201710775099.6, filed on Aug. 31, 2017, the contents of which are incorporated herein by reference in its entirety.

TECHNICAL FIELD

The present disclosure relates to the field of display technology, and in particular to an optical waveguide and an optical device.

BACKGROUND

Augmented Reality (AR) is a new technology that integrates real-world information and virtual world information together. AR can supplement and superimpose the virtual world information and the real-world information with each other. The virtual world information and the real-world information are displayed and presented together to the eyes of a user, thereby greatly enriching the user's visual experience. Based on the above advantages of the enhanced display technology, AR is widely used in display products, such as augmented reality glasses.

SUMMARY

According to an aspect of the disclosure, there is provided an optical waveguide. The optical waveguide includes: a first total reflection surface and a second total reflection surface, disposed opposite to each other; at least two transflective films, disposed between the first total reflection surface and the second total reflection surface, anyone of the transflective films forming an angle with the first total reflection surface, and anyone of the transflective films forming an angle with the second total reflection surface; a first phase retardation film, disposed on an inner surface of the first total reflection surface between two adjacent transflective films; and a second phase retardation film, disposed on an inner surface of the second total reflection surface between the two adjacent transflective films.

Each of the transflective films may completely transmit light having a first polarization state, half transmit and half reflect light having a second polarization state, so that reflected light having the second polarization state propagates through the second phase retardation film and the second total reflection surface toward a target.

The optical waveguide may convert light having the second polarization state to light having the first polarization state after the light having the second polarization state is totally reflected by the first phase retardation film and the first total reflection surface, and may convert light having the first polarization state to light having the second polarization state after the light having the first polarization state is totally reflected by the second phase retardation film and the second total reflection surface.

Each of the light having the first polarization state and the light having the second polarization state is linearly polarized light; and a polarization direction of the light having the first polarization state is perpendicular to a polarization direction of the light having the second polarization state.

Optionally, along a light transmission direction of the optical waveguide, transmittances of the at least two transflective films for the light having the second polarization state decrease sequentially, and reflectances of the at least two transflective films for the light having the second polarization state increase sequentially.

Optionally, each of the phase retardation films is a quarter wave plate, an angle between an optical axis of the quarter wave plate and the polarization direction of the light having the first polarization state is 45°, and an angle between the optical axis of the quarter wave plate and the polarization direction of the light having the second polarization state is 45°.

Optionally, the optical waveguide has a thickness of 1.6 nm to 2.5 nm.

Optionally, the angle between anyone of the transflective films and the first total reflection surface is in a range of 25° to 35°; and the angle between anyone of the transflective films and the second total reflection surface is in a range of 25° to 35°.

Optionally, a distance between center points of the two adjacent transflective films is 2.2 nm to 5.5 nm.

Optionally, in the two adjacent transflective films, a first transflective film intersects the first total reflection surface at a first intersection line, and a second transflective film intersects the second total reflection surface at a second intersection line, and an orthogonal projection of the first intersection line on the second total reflection surface overlaps wholly with the second intersection line.

Optionally, the at least two transflective films are disposed in parallel.

Optionally, a thickness of each of the transflective films is inversely proportional to its transmittance.

Optionally, each of the transflective films is made of a fluoride material.

Optionally, each of the transflective films is made of two materials of magnesium fluoride and lanthanum fluoride.

According to an aspect of the disclosure, there is provided an optical device. The optical device includes a display source and an optical waveguide. The optical waveguide includes: a first total reflection surface and a second total reflection surface, disposed opposite to each other; at least two transflective films, disposed between the first total reflection surface and the second total reflection surface, anyone of the transflective films forming an angle with the first total reflection surface, and anyone of the transflective films forming an angle with the second total reflection surface; a first phase retardation film, disposed on an inner surface of the first total reflection surface between two adjacent transflective films; and a second phase retardation film, disposed on an inner surface of the second total reflection surface between the two adjacent transflective films.

Each of the transflective films may completely transmit light having a first polarization state, half transmit and half reflect light having a second polarization state, so that reflected light having the second polarization state propagates through the second phase retardation film and the second total reflection surface toward a target.

The optical waveguide may convert light having the second polarization state to light having the first polarization state after the light having the second polarization state is totally reflected by the first phase retardation film and the first total reflection surface, and may convert light having the first polarization state to light having the second polarization state after the light having the first polarization state is totally reflected by the second phase retardation film and the second total reflection surface.

Each of the light having the first polarization state and the light having the second polarization state is linearly polarized light; and a polarization direction of the light having the first polarization state is perpendicular to a polarization direction of the light having the second polarization state.

Optionally, along a light transmission direction of the optical waveguide, transmittances of the at least two transflective films for the light having the second polarization state decrease sequentially, and reflectances of the at least two transflective films for the light having the second polarization state increase sequentially.

Optionally, each of the phase retardation films is a quarter wave plate, an angle between an optical axis of the quarter wave plate and the polarization direction of the light having the first polarization state is 45°, and an angle between the optical axis of the quarter wave plate and the polarization direction of the light having the second polarization state is 45°.

Optionally, the optical waveguide has a thickness of 1.6 nm to 2.5 nm.

Optionally, the angle between anyone of the transflective films and the first total reflection surface is in a range of 25" to 35"; and the angle between anyone of the transflective films and the second total reflection surface is in a range of 25" to 35".

Optionally, a distance between center points of the two adjacent transflective films is 2.2 nm to 5.5 nm.

Optionally, in the two adjacent transflective films, a first transflective film intersects the first total reflection surface at a first intersection line, and a second transflective film intersects the second total reflection surface at a second intersection line, and an orthogonal projection of the first intersection line on the second total reflection surface overlaps wholly with the second intersection line.

Optionally, the at least two transflective films are disposed in parallel.

Optionally, a thickness of each of the transflective films is inversely proportional to its transmittance.

DETAILED DESCRIPTION

Figure 1:
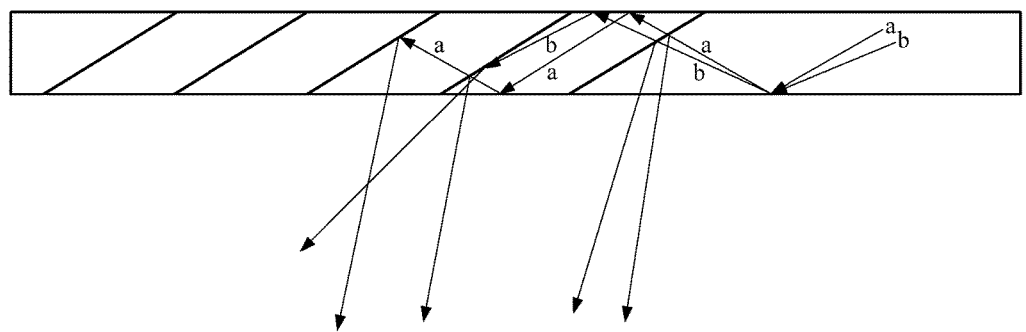
FIG. 1 is a schematic diagram of a transmission path within an optical waveguide.

To make the above objectives, features, and advantages of the present disclosure more comprehensible, the present disclosure will be further described in detail with reference to the accompanying drawings and specific implementations.

In the description of the present disclosure, "a plurality of" means two or more than two unless otherwise specified; The orientations or positional relationships indicated by the terms "upper", "lower", "left", "right", "inner", and "outer", etc. are based on the orientations or position relationships shown in the drawings and are merely for the convenience of describing the present disclosure and simplifying descriptions, but are not intended to indicate or imply that the referred machine or element must have a specific orientation, or be configured and operated in a specific orientation, therefore cannot be construed as limiting the present disclosure.

In the description of the present disclosure, it should be noted that the terms "install", "connect", and "connected" should be understood in a broad sense unless specifically defined or limited otherwise, and may be, for example, a fixed connection, a removable connection, or an integral connection; it can be a mechanical or electrical connection; it can be a direct connection or an indirect connection through an intermediary. For a person of ordinary skill in the art, the specific meanings of the above terms in the present disclosure can be understood in specific situations.

Specific implementations of the present disclosure will be further described in detail below with reference to the accompanying drawings and embodiments. The following examples are intended to illustrate the present disclosure but are not intended to limit the scope of the disclosure.

The existing augmented reality glasses have the effect of augmented reality, but generally have a problem that the user's visual field is poor due to a too small visual angle when the glasses are used, thereby deteriorating the user's visual experience.

At present, in order to increase the visual angle of augmented reality glasses, augmented reality optical module technology is mainly used for improving the augmented reality glasses. Specifically, an optical waveguide is arranged in the augmented reality glasses, and the optical waveguide includes a plurality of optical waveguide elements sequentially arranged in series. The optical waveguide increases the visual angle of the augmented reality glasses through the reflection of the inclined sidewall of each optical waveguide element. However, due to the influence of each of a plurality of inclined sidewalls and the transmission characteristics of the optical waveguide, a large amount of stray light is generated during light transmission.

Referring to FIG. 1, light a is desired, and the light a is injected on an inner surface of a bottom wall of the optical waveguide and is reflected to a first inclined sidewall. A part of the light is reflected out of the optical waveguide, and another part of the light is transmitted through the first inclined sidewall, continues to propagate forward, is incident on a top wall of the optical waveguide and reflected to the bottom wall of the optical waveguide, and then the light is totally reflected to a second inclined sidewall. A part of the light is reflected outside the optical waveguide, and another part of the light is transmitted through the second inclined sidewall and continues to propagate forward. The transmission of the light a is completed in the above manner. Due to a too large transmission angle, the light b shown in FIG. 1 is incident on the top wall of the optical waveguide after passing through the first inclined sidewall, is reflected to the second inclined sidewall by the top wall, and is reflected outside the optical waveguide by the second inclined sidewall. Because the transmission angle of this light is too large, the light output from the optical waveguide may be incident onto another position, which interferes with light in the another position. Therefore, the light b is not desired, and it is called as a stray light. The presence of the stray light seriously affects the imaging quality and deteriorates the user' experience. The transmission angle refers to the angle between the incident light and a normal line.

In order to at least in part solve the problem that the stray light seriously affects the imaging quality and deteriorates the user's experience, embodiments of the present disclosure provide an optical waveguide that can be applied to an optical device.

Figure 2:
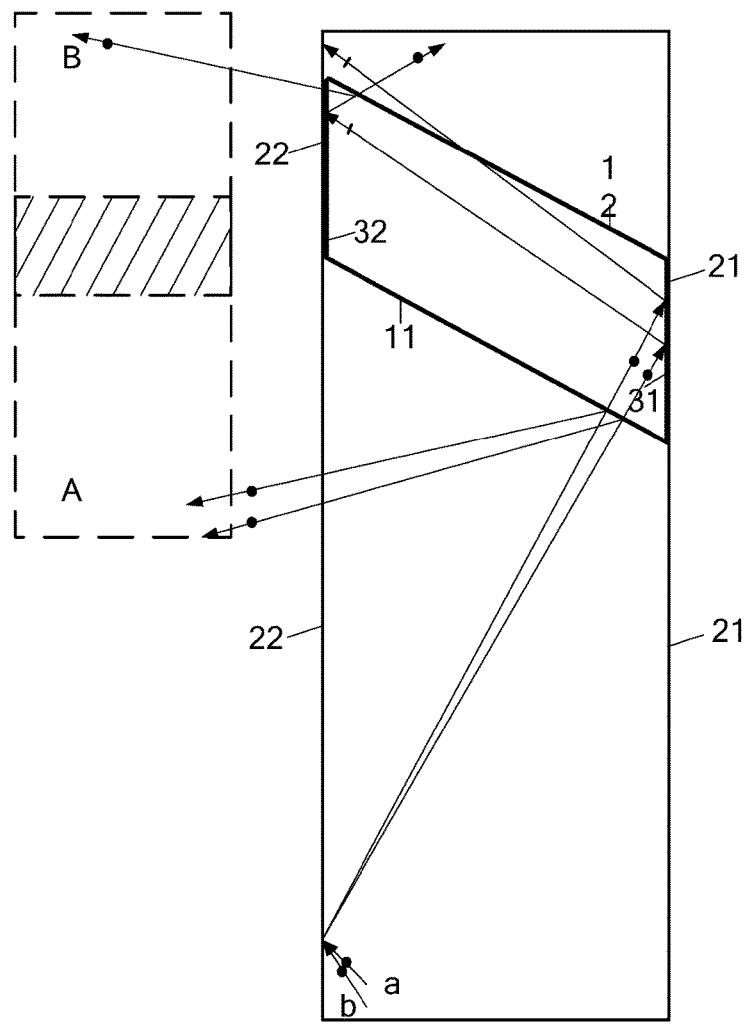
FIG. 2 is a schematic structural diagram of an optical waveguide according to an embodiment of the present disclosure.

FIG. 2 is a schematic structural diagram of an optical waveguide according to an embodiment of the present disclosure. An arrow direction in FIG. 2 is a transmission direction of light in the optical waveguide. In FIG. 2, light with a horizontal line is P-light, the P-light has a first polarization state, light with a round spot is S-light, and the S-light has a second polarization state. The light having the first polarization state and the light having the second polarization state are both linearly polarized light and the polarization directions thereof are perpendicular to each other.

The optical waveguide shown in FIG. 2 includes a first total reflection surface 21 and a second total reflection surface 22 disposed opposite to each other, and at least two transflective films are disposed between the first total reflection surface 21 and the second total reflection surface 22. The optical waveguide shown in FIG. 2 includes a transflective film 11 and a transflective film 12, and anyone of the transflective films forms an angle with the first total reflection surface 21, and anyone of the transflective films forms an angle with the second total reflection surface 22. A first phase retardation film 31 is disposed on the inner surface of the first total reflection surface 21 between two adjacent transflective films, and a second phase retardation film 32 is disposed on the inner surface of the second total reflection surface 22 between the two adjacent transflective films.

When incident light incident to the optical waveguide has the second polarization state, each transflective film completely transmits light having the first polarization state, and half transmits and half reflects light having the second polarization state, so that reflected light having the second polarization state propagates through the second phase retardation film 32 and the second total reflection surface 22 toward a target; the target may be various, such as human eyes.

Alternatively, when incident light incident to the optical waveguide has the first polarization state, each transflective film completely transmits light having the second polarization state, and half transmits and half reflects light having the first polarization state, so that reflected light having the first polarization state propagates through the second phase retardation film 32 and the second total reflection surface 22 toward the target.

The optical waveguide may convert light having the second polarization state to light having the first polarization state after the light having the second polarization state is totally reflected by the first phase retardation film 31 and the first total reflection surface 21; and to convert light having the first polarization state to light having the second polarization state after the light having the first polarization state is totally reflected by the second phase retardation film 32 and the second total reflection surface 22. The light having the first polarization state and the light having the second polarization state are both linearly polarized light and the polarization directions thereof are perpendicular to each other.

The angle between anyone of the transflective films and the first total reflection surface 21 and the angle between anyone of the transflective films and the second total reflection surface 22 may be set according to actual conditions.

In FIG. 2, a region A is the region where the light reflected by the transflective film 11 from the optical waveguide is located, and a region B is the region where the light reflected by the transflective film 12 from the optical waveguide is located. The regions A and B partially overlap. According to the comparison of regions A and B, it can be seen that providing at least two transflective films in the optical waveguide can enlarge the visible range of the optical waveguide.

The light incident to the optical waveguide may include one or more beams. Hereafter, the propagation of light in the waveguide is described by using S-light having the second polarization state as the light incident to the optical waveguide. The incident S-light is first incident on the second total reflection surface 22 and totally reflected by the second total reflection surface 22, and the totally reflected S-light is incident on the transflective film 11 and is half transmitted and half reflected by the transflective film 11, so that a part of the S-light is transmitted outside the optical waveguide through the second total reflection surface 22 towards to the target, and another part of the S-light is transmitted through the transflective film 11 to the first phase retardation film 31 and the first total reflection surface 21. After being reflected by the first phase retardation film 31 and the first total reflection surface 21, the S-light is converted into the P-light having the first polarization state, where a polarization direction of the S-light is orthogonal to a polarization direction of the P-light. After propagating to the transflective film 12, the P-light is completely transmitted through the transflective film 12 and continues to propagate forward; another P-light is incident on the second total reflection surface 22 and the second phase retardation film 32 and then is converted to the S-light having the second polarization state. And then the S-lights is incident on the transflective film 12 and half transmitted and half reflected by the transflective film 12. A part of the S-lights is reflected outside the optical waveguide through the second total reflection surface 22 towards to the target, and another part of the S-light is transmitted through the transflective film 12.

It is to be understood that the incident S-light incident on the second total reflection surface 22 needs to meet a total reflection condition, so that the S-light can be totally reflected by the second total reflection surface 22; furthermore, the part of S-light reflected by the transflective film 11 is transmitted through the second total reflection surface 22 outside the optical waveguide due to the fact that the part of S-light does not meet the total reflection condition at the second total reflection surface 22. The above total reflection conditions are applicable to the following embodiments, and therefore a same or similar description is omitted.

It is to be noted that the light incident to the waveguide may also be P-light having the first polarization state. When the light incident to the optical waveguide is the P-light having the first polarization state, each transflective film may completely transmit the S-light having the second polarization state, and half transmit and half reflect the P-light having the first polarization state, so that the reflected P-light having the first polarization state propagates through the second phase retardation film 32 and the second total reflection surface 22 toward to the target.

Specifically, when the light incident to the optical waveguide is P-light having the first polarization state, the P-light is converted to the S-light having the second polarization state after being totally reflected by the first phase retardation film 31 and the first total reflection surface 21. The polarization direction of the P-light is orthogonal to the polarization direction of the S-light. After the S light propagates to the transflective film 12, the S light is completely transmitted through the transflective film 12 and continues to propagate forward; the another S-light is incident on the second total reflection surface 22 and the second phase retardation film 32, and then converted into the P-light having the first polarization state. The P-light is incident on the transflective film 12 and is half transmitted and half reflected by the transflective film 12, so that a part of the P-light is transmitted outside the optical waveguide through the second total reflection surface 22 towards to the target, and the other part of the P-light is transmitted through the transflective film 12.

The optical waveguide according to the embodiment of the present disclosure includes the first transflective film 11, the second transflective film 12, the first total reflection surface 21, the second total reflection surface 22, the first phase retardation film 31, and the second phase retardation film 32. Based on the structure arrangements and function settings of all elements above, such that after passing through the phase retardation film and the total reflection surface, the light incident on the transflective film completely transmits through the transflective film without reflection, thereby ensuring the transmission angle of the light output to the outside of the optical waveguide to be sufficiently small, which effectively solves the problem of the stray light, ensures the imaging quality and improves the user's experience.

Figure 3:
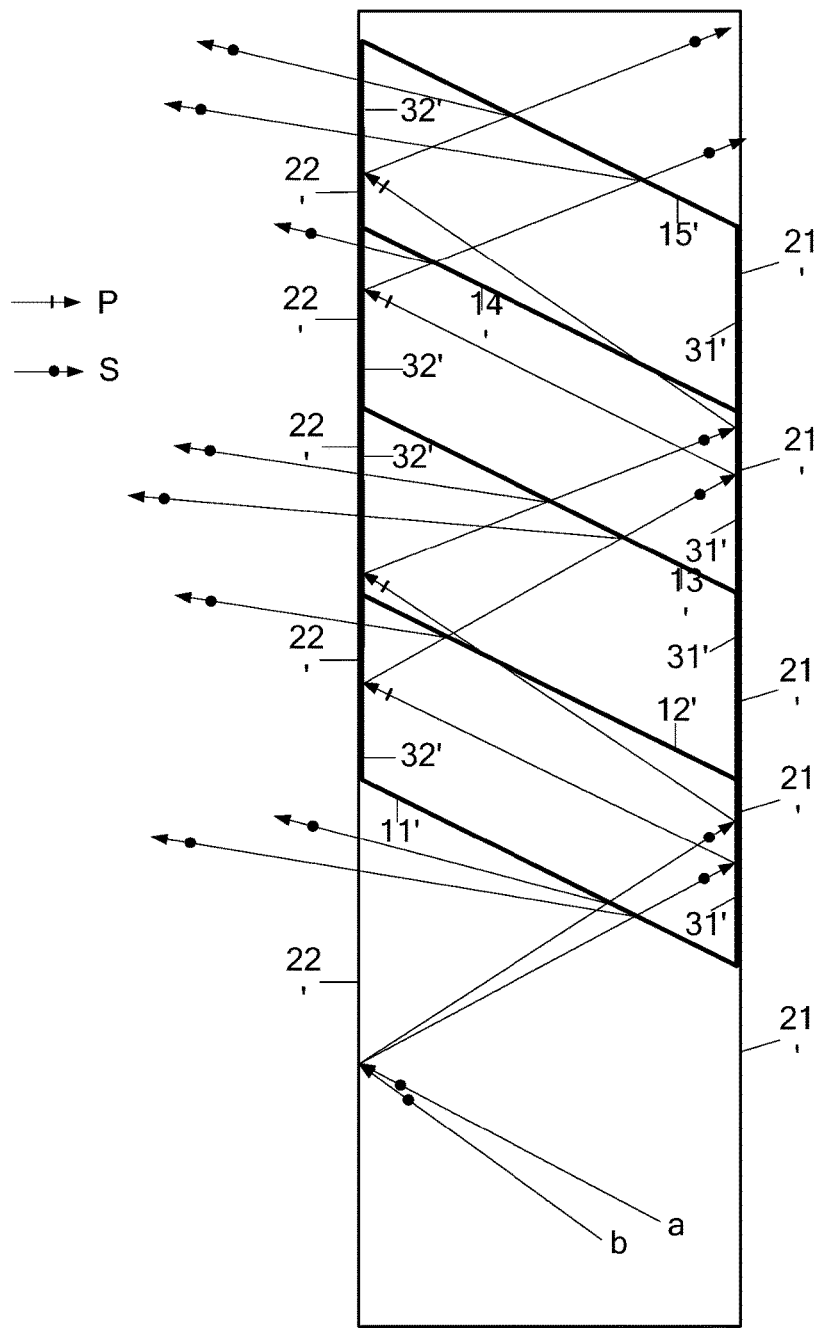
FIG. 3 is a schematic structural diagram of another optical waveguide according to an embodiment of the present disclosure.

FIG. 3 is a schematic structural diagram of another optical waveguide according to an embodiment of the present disclosure. The arrow direction in FIG. 3 is the direction of light transmission in the optical waveguide. In FIG. 3, light with a horizontal line is P-light, and the P-light has a first polarization state; light with a round spot is S-light, and the S-light has a second polarization state. The light having the first polarization state and the light having the second polarization state are both linearly polarized light and the polarization directions thereof are perpendicular to each other.

The optical waveguide shown in FIG. 3 is provided with a plurality of transflective films, specifically including a first transflective film 11', a second transflective film 12', a third transflective film 13', a fourth transflective film 14' and a fifth transflective film 15'. Each of first phase retardation films 31' is disposed on the first total reflection surface 21' between any two adjacent transflective films, and each of second phase retardation films 32' is disposed on the second total reflection surface 22' between any two adjacent transflective films.

The light incident on the optical waveguide may include one or more beams. The light beams may all be S-light having the second polarization state, or all may be P-light having the first polarization state. The polarization direction of the S-light is orthogonal to the polarization direction of P-light.

In FIG. 3, the light with a round spot is the S-light having the second polarization state. The incident S-light is firstly incident onto the second total reflection surface 22' of the optical waveguide and is totally reflected by the second total reflection surface 22'. The totally reflected S-light is incident onto the transflective film 11', is half transmitted and half reflected by the transflective film 11', so that a part of the S-light is reflected outside the optical waveguide through the second total reflection surface 22', and the S-light propagates to the target, and another part of the S-light is transmitted through the transflective film 11' to the first phase retardation film 31' and the first total reflection surface 21'. After reflected by the first phase retardation film 31' and the first total reflection surface 21', the S-light is converted into P-light having the first polarization state, and the converted P-light having the first polarization state is incident onto the transflective film 12' and passes through the transflective film 12' completely.

Further, after being reflected by the second phase retardation film 32' and the second total reflection surface 22', the P light having the first polarization state passing through the transflective film 12' is converted into the S-light having the second polarization state and propagates to the next transflective film, ie., the transflective film 13'. After propagating to the transflective film 13', the S-light having the second polarization state is half transmitted and half reflected by the transflective film 13', so that a part of the S-light passes through the transflective film 13' and continues to propagate in the optical waveguide, and another part of the S-light is transmitted through the second phase retardation film 32' and the second total reflection surface 22'. Since the incident angle thereof changes, the S-light is not totally reflected by the second total reflection surface 22', but directly transmitted through the second total reflection surface 22 towards the target outside the optical waveguide.

It is noted that the light incident on the optical waveguide may also be P-light having the first polarization state. When the incident light incident on the optical waveguide is P-light having the first polarization state, each transflective film completely transmits S-light having the second polarization state, and half transmits and half reflects the P-light having the first polarization state, so that the reflected P-light having the first polarization state are transmitted through the second phase retardation film 32' and the second total reflection surface 22' towards to the target.

When the light incident into the optical waveguide is P-light having the first polarization state, the principle of reflection and transmission when the light propagates in the optical waveguide is the same as that described in reference to FIG. 2, and thus a detailed description thereof is omitted here.

Based on the above analysis of the light path, it can be seen that light reflected to the outside of the optical waveguide is generated by the light reflected by the second total reflection surface 22' to the transflective films 11', 13' and 15'. Therefore, the transmission angle of the light is small and may fall on a visual region of the human eyes.

In the optical waveguide structure, the arrangement of the plurality of transflective films and the plurality of phase retardation films prevents the light reflected by the first total reflection surface 21' to the transflective films 12' and 14' from being transmitted to the outside of the optical waveguide. Instead, the light transmitted to the outside of the optical waveguide is generated by the light reflected by the second total reflection surface 22' to the transflective films 11', 13' and 15', which avoids the generation of the stray light, effectively solves the problem of the stray light, ensures the imaging quality, and improves the user's experience.

The optical waveguide according to the embodiments of the present disclosure includes at least two transflective films, and a transmittance and a reflectance of each transflective film for light may be designed according to actual conditions.

For example, along the light transmission direction of the optical waveguide, the transmittances of the at least two transflective films for light sequentially decrease, and the reflectances of the at least two transflective films for light sequentially increase, so as to ensure that the brightness of the light on the light exit surface of the optical waveguide is evenly distributed. Specifically, for example, five transflective films are disposed in the optical waveguide. Along the light transmission direction of the optical waveguide, the transmittance of a first transflective film located at the light entrance is 88%, and its reflectance is 12%; the transmittance of a second transflective film is 86.4%, and its reflectance is 13.6%, the transmittance of a third transreflective film is 84.2%, and its reflectance is 15.8%, the transmittance of a fourth transreflective film is 81.2%, and its reflectance is 18.8%; and the transmittance of a fifth transflective film is 76.9%, and its reflectance is 23.1%.

In an embodiment of the present disclosure, each of the phase retardation films within the optical waveguide may be a quarter wave plate, and the angle between the optical axis of the quarter wave plate and a polarization direction of the light having the first polarization state is 45". The angle between the optical axis of the quarter wave plate and a polarization direction of the light having the second polarization is 45".

The above-mentioned setting of the angle between the optical axis of the quarter wave plate and the polarization direction of the light ensures that the linearly-polarized light incident on the optical waveguide is converted into a circularly polarized light after passing through the quarter wave plate. The rotation direction of the circularly polarized light changes after the circularly polarized light is reflected by the total reflection surface. After passing through the quarter wave plate again, the polarization direction of the light is perpendicular to the polarization direction of the incident light. If the incident light is S-polarized light, the S-polarized light is converted into P-polarized light after passing through the quarter wave plate and total reflection surface, with the polarization direction of the S-polarized light being perpendicular to the polarization direction of the P-polarized light. If the incident light is P-polarized light, the P-polarized light is converted into S-polarized light after passing through the quarter wave plate and the total reflection surface. The phase retardation film may also be other suitable films.

In an embodiment of the disclosure, for example, the optical waveguide has a thickness of 1.6-2.5 nm.

In an embodiment of the disclosure, for example, an angle between any one of the transflective films and the first total reflection surface is in the range of 25-35°; and an angle between any one of the transflective films and the second total reflection surface is in the range of 25-35°.

In an embodiment of the disclosure, for example, a distance between the center points of two adjacent transflective films is 2.2-5.5 nm.

Each of the transflective films may be in a variety of shapes. Accordingly, the center point of the transflective film may be set differently. When the transflective film is a rectangle, the center point of the transflective film may be a diagonal midpoint of the rectangle.

Figure 4:
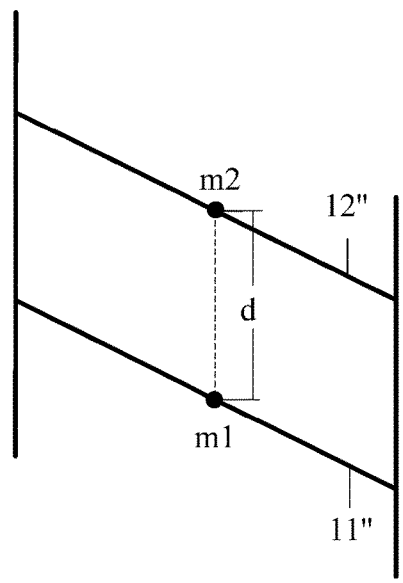
FIG. 4 is a schematic partial structural diagram of an optical waveguide according to an embodiment of the present disclosure.

FIG. 4 is a schematic partial structural diagram of an optical waveguide according to an embodiment of the present disclosure. For clarity of illustration, only a cross section of the optical waveguide is shown. In FIG. 4, a first transflective film 11" and a second transflective film 12" are disposed in the optical waveguide, and each of the transflective films has a rectangular structure. A point m1 is a projection point of a midline of the rectangular structure of the first transmissive film 11" on the cross section. A point m2 is a projection point of a midline of the rectangular structure of the second transflective film 12" on the cross section. A distance d between the point m1 and the point m2 is a distance between the center points of the first transflective film 11" and the second transflective film 12". In an embodiment of the disclosure, for example, the distance between the center points of two adjacent transflective films is 2.2-5.5 nm.

With the above structure and size, the optical waveguide has good optical transmission performance, and no light leakage occurs.

Figure 5:
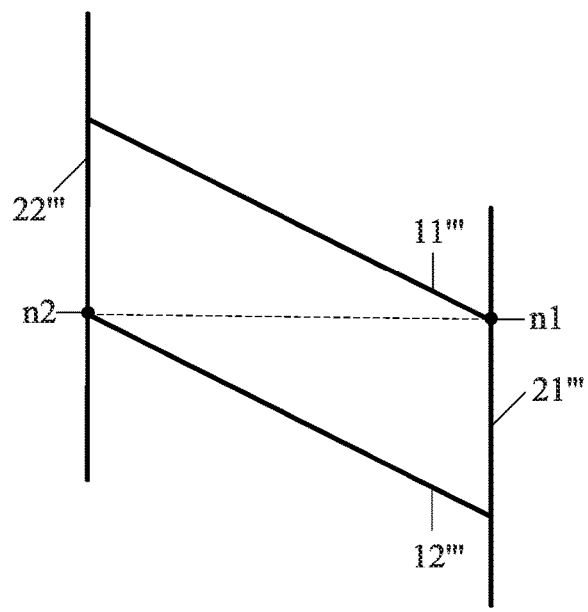
FIG. 5 is a schematic partial structural diagram of another optical waveguide according to an embodiment of the present disclosure.

FIG. 5 is a schematic partial structure diagram of another optical waveguide according to an embodiment of the present disclosure. For clarity of illustration, only a cross section of the optical waveguide is shown. In FIG. 5, a first transflective film 11''' and a second transflective film 12''' are disposed adjacently in the optical waveguide. The first transflective film 11''' intersects the first total reflection surface 21''' of the optical waveguide at a first intersecting line n1, and the first intersecting line n1 is shown as a single point. The second transflective film 12''' intersects the second total-reflection surface 22''' at a second intersection line n2, and the second intersection line n2 is shown as a single point. An orthogonal projection of the first intersection line n1 on the second total reflection surface 22''' overlaps wholly with the second intersection line n2.

With the above structure, no light leakage occurs in the optical waveguide, and the optical transmission performance of the optical waveguide is good.

In an embodiment of the disclosure, with at least two transflective films, two adjacent transflective films may or may not be disposed in parallel, and the specific structure may be set according to actual conditions. For example, parallel arrangement of two adjacent transflective films may facilitate the light control.

In an embodiment of the disclosure, a thickness of each of the transflective films may be inversely proportional to its transmittance, that is, the greater the thickness of the transflective film, the smaller its transmittance.

In an embodiment of the disclosure, each of the transflective films may be made of a fluoride material. Specifically, each of the transflective films may be made of two materials, such as magnesium fluoride ($MgF_2$) and lanthanum fluoride ($LaF_3$). Each of the transflective films may also be made of other suitable materials.

In the embodiments of the present disclosure, a material of the optical waveguide may be glass or transparent resin, and may also be other suitable materials. The material of the optical waveguide may be selected according to actual conditions.

An embodiment of the present disclosure provides an optical device including a display source (e.g., it may include a light source and the data to be displayed) and the optical waveguide according to the above embodiments of the present disclosure.

In practice, when the light emitted by the display source is visible light, a polarizing plate may be added near the light emitting port of the display source to obtain light having a polarization state, and then the light having the polarization state is transmitted to the optical waveguide. Alternatively, a polarizing plate may be added near the light entrance of the optical waveguide to filter the visible light emitted by the display source to obtain light having a polarization state. Other applicable structures and corresponding processing methods may also be used.

Since the optical device according to the embodiment of the present disclosure includes the optical waveguide according to the above embodiments of the present disclosure, the optical device has the advantages of the optical waveguide, that is, the optical device has no stray light, the optical performance thereof is good, and the user's experience is improved.

According to the embodiments of the present disclosure, two methods for manufacturing the above-described optical waveguide is provided further.

Figure 6:
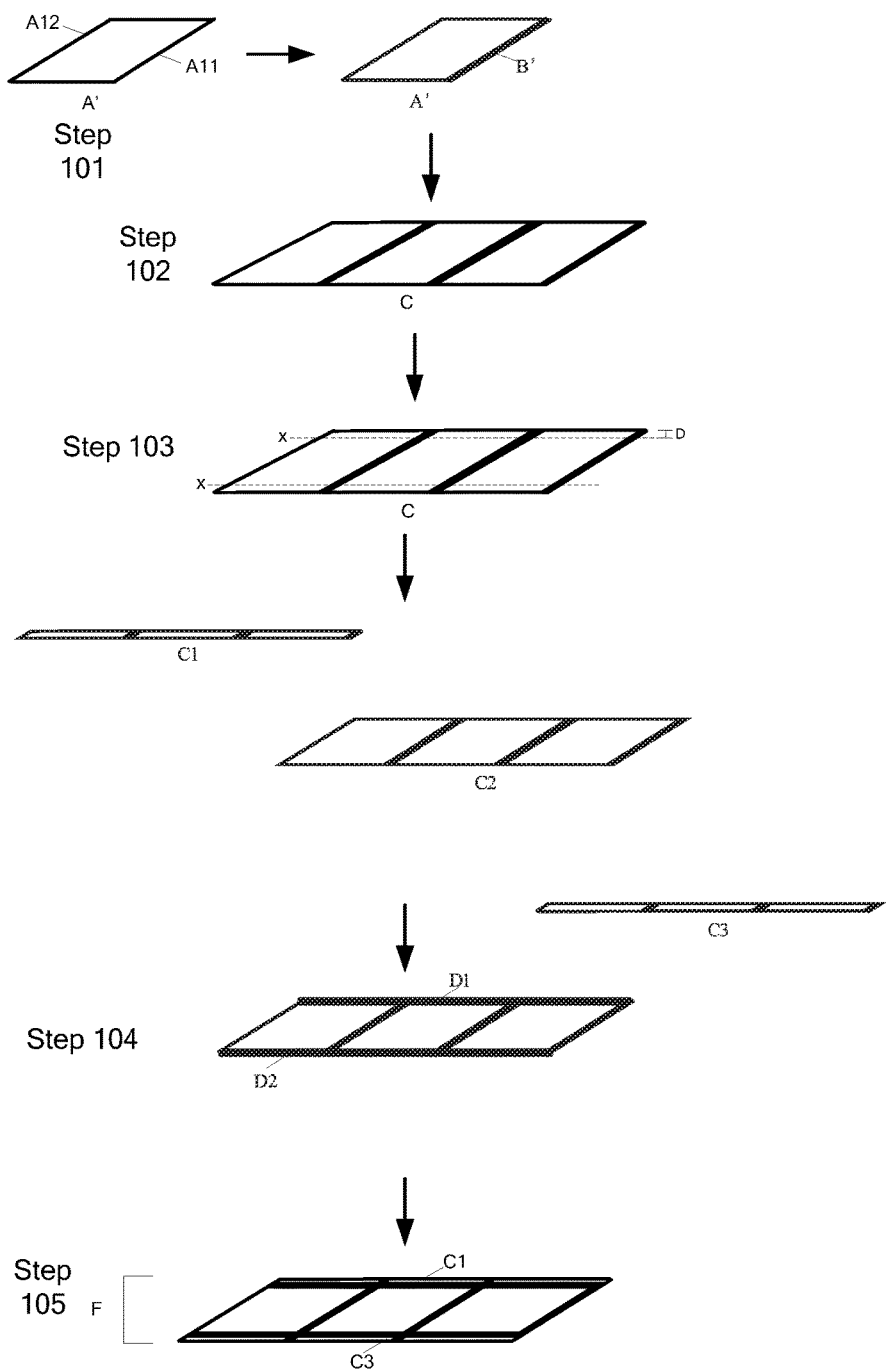
FIG. 6 is a flowchart of manufacturing an optical waveguide according to an embodiment of the present disclosure.

FIG. 6 is a flowchart of manufacturing an optical waveguide according to an embodiment of the present disclosure. For clarity of illustration, FIG. 6 only shows a parallelogram shaped upper surface of a hexahedron structured optical waveguide, and illustration of other surfaces is omitted. Referring to FIG. 6, an optical waveguide according to an embodiment of the present disclosure may be manufactured by the following method.

In step 101: a plurality of waveguide elements A' are formed, and a transflective film B' is formed on a first inclined sidewall A11 of each waveguide element A.

In FIG. 6, the waveguide element A' has a hexahedral structure and includes a first inclined sidewall A11 and a second inclined sidewall A12 oppositely disposed and a first total reflection surface and a second total reflection surface oppositely disposed. The main view of the waveguide element A' is a parallelogram. The first total reflection surface and the second total reflection surface are disposed in parallel. The angle between the first inclined sidewall A11 and each of the two total reflection surfaces and the angle between the second inclined sidewall A12 and each of the two total reflection surfaces may be set according to actual conditions.

The transflective film may be formed on the inclined sidewall of the waveguide element in various ways, such as by evaporation or magnetron sputtering, and other suitable formation methods may also be used. The plurality of waveguide elements may be connected in series by various methods, for example, the plurality of waveguide elements may be bonded using an adhesive.

In step 102: the plurality of waveguide elements A' each having the transflective film B' are spliced to obtain a waveguide body C. Specifically, among the adjacent two waveguide elements A', the transflective film B' on the first inclined sidewall A11 of one waveguide element A' is connected to the second inclined sidewall A12 of another waveguide element A' to obtain the waveguide body C.

In step 103: along an x-axis direction as shown in FIG. 6, the upper and lower portions of the waveguide body C are cut according to a distance D to obtain a first portion C1 of the waveguide body, a second portion C2 of the waveguide body, and a third portion C3 of the waveguide body. The distance D may be set according to the actual conditions.

In step 104, a first phase retardation film D1 is formed on an upper surface of the second portion C2 of the waveguide body C, and a second phase retardation film D2 is formed on a lower surface of the second portion C2 of the waveguide body C.

In step 105, the first portion C1 of the waveguide body C is attached to the phase retardation film D1 on the second portion C2 of the waveguide body C, and the third portion C3 of the waveguide body C is attached to the phase retardation film D2 on the second portion C2 of the waveguide body C so that an optical waveguide F is obtained.

Figure 7:
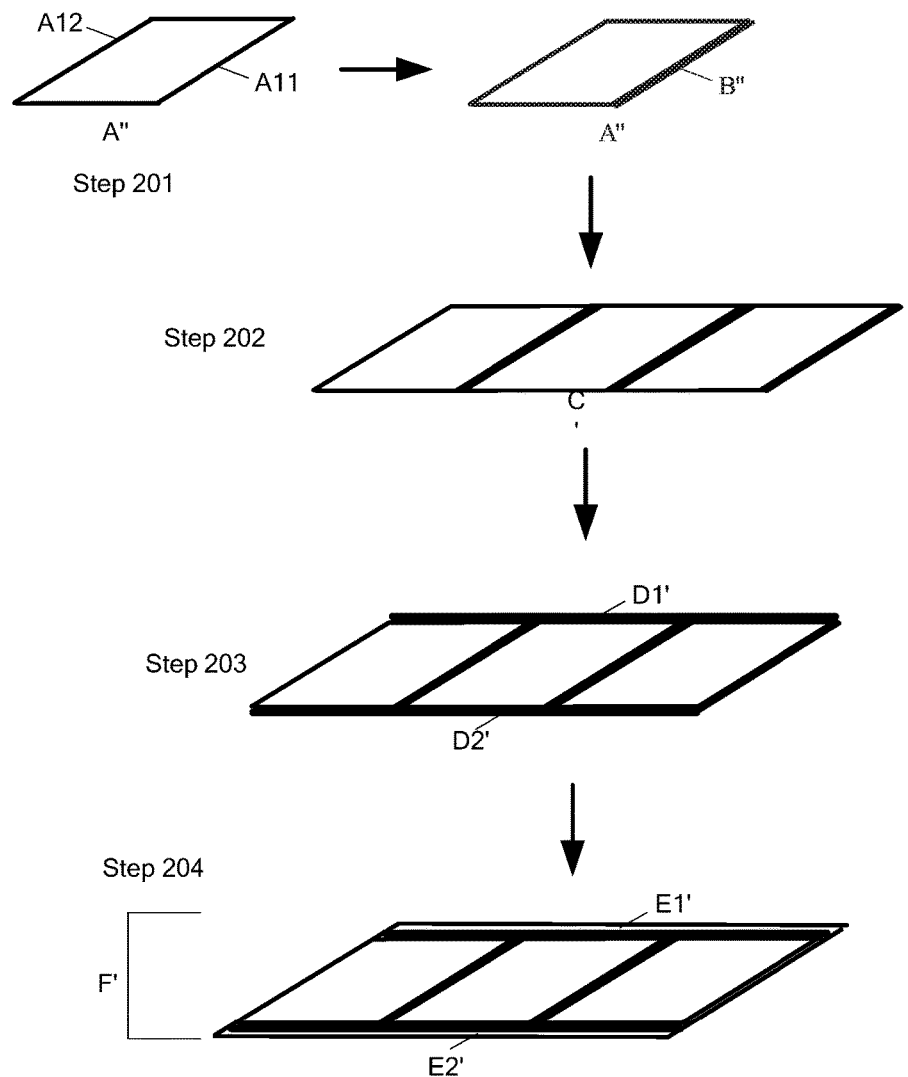
FIG. 7 is a flowchart of manufacturing another optical waveguide according to an embodiment of the present disclosure.

FIG. 7 is a flowchart of manufacturing another optical waveguide according to an embodiment of the present disclosure. For clarity of illustration, FIG. 7 only shows a parallelogram shaped upper surface of a hexahedron structured optical waveguide, and illustration of other surfaces is omitted. Referring to FIG. 7, an optical waveguide according to an embodiment of the present disclosure may be manufactured by the following method.

In step 201, a plurality of waveguide elements A" are formed, and a transflective film B" is formed on a first inclined sidewall A11' of each waveguide element A".

In step 202, the plurality of waveguide elements A" each having the transflective film B" are spliced to obtain a waveguide body C'. Specifically, among the adjacent two waveguide elements A", the transflective film B" on the first inclined sidewall A11 of one waveguide element A" is connected to the second inclined sidewall A12' of another waveguide element A" to obtain the waveguide body C'.

In step 203, a first phase retardation film D1' is formed on an upper surface of the waveguide body C', and a second phase retardation film D2' is formed on a lower surface of the waveguide body C'.

In step 204, a pre-made first waveguide sheet E1' with a predetermined thickness is attached onto the first phase retardation film D1', and a pre-made second waveguide sheet E2' with a preset thickness is attached onto the second phase retardation film D2', so that an optical waveguide F' is obtained. Here, the thicknesses of the first waveguide sheet E1' and the second waveguide sheet E2' may be set according to the actual conditions, and the thicknesses are generally small, for example, in the range of 0.1 to 0.3 nm.

The embodiments of the present disclosure provide two manufacturing methods of the optical waveguides according to the present disclosure, and there may be other applicable manufacturing methods as well, and the disclosure is not limited thereto.

The embodiments in this specification are described in a progressive manner, and each embodiment focuses on the difference from other embodiments. For the same or similar parts among the embodiments, reference may be made to each other.

The optical waveguides and optical devices provided by the present disclosure have been described in detail above. Specific examples are used herein to describe the principle and implementations of the present disclosure. The above embodiments are only used to help understand the method of the present disclosure and its core concept. At the same time, for those of ordinary skill in the art, specific embodiments and application ranges will change based on the concept of the present disclosure. In summary, the contents of this specification should not be construed as limiting the present disclosure.

What is claimed is:
1. An optical waveguide, comprising:
a first total reflection surface and a second total reflection surface, disposed opposite to each other;
at least two transflective films, disposed between the first total reflection surface and the second total reflection surface, each of the transflective films forming an angle with the first total reflection surface, and each of the transflective films forming an angle with the second total reflection surface;
a first phase retardation film, disposed on an inner surface of the first total reflection surface between two adjacent transflective films; and a second phase retardation film, disposed on an inner surface of the second total reflection surface between the two adjacent transflective films;

wherein each of the transflective films is configured to completely transmit light having a first polarization state, half transmit and half reflect light having a second polarization state, so that reflected light having the second polarization state propagates through the second phase retardation film and the second total reflection surface toward a target;

wherein the optical waveguide is configured to convert light having the second polarization state to light having the first polarization state after the light having the second polarization state is totally reflected by the first phase retardation film and the first total reflection surface, and to convert light having the first polarization state to light having the second polarization state after the light having the first polarization state is totally reflected by the second phase retardation film and the second total reflection surface;

wherein each of the light having the first polarization state and the light having the second polarization state is linearly polarized light; and wherein a polarization direction of the light having the first polarization state is perpendicular to a polarization direction of the light having the second polarization state.

2. The optical waveguide according to claim 1, wherein along a light transmission direction of the optical waveguide, transmittances of the at least two transflective films for the light having the second polarization state decrease sequentially, and reflectances of the at least two transflective films for the light having the second polarization state increase sequentially.

3. The optical waveguide according to claim 1, wherein each of the phase retardation films is a quarter wave plate, an angle between an optical axis of the quarter wave plate and the polarization direction of the light having the first polarization state is 45°, and an angle between the optical axis of the quarter wave plate and the polarization direction of the light having the second polarization state is 45°.

4. The optical waveguide according to claim 1, wherein the optical waveguide has a thickness of 1.6 nm to 2.5 nm.

5. The optical waveguide according to claim 1, wherein the angle between each of the transflective films and the first total reflection surface is in a range of 25° to 35°; and
    the angle between each of the transflective films and the second total reflection surface is in a range of 25° to 35°.

6. The optical waveguide according to claim 1, wherein a distance between center points of the two adjacent transflective films is 2.2 nm to 5.5 nm.

7. The optical waveguide according to claim 1, wherein in the two adjacent transflective films, a first transflective film intersects the first total reflection surface at a first intersection line, and a second transflective film intersects the second total reflection surface at a second intersection line, and an orthogonal projection of the first intersection line on the second total reflection surface overlaps wholly with the second intersection line.

8. The optical waveguide according to claim 1, wherein the at least two transflective films are disposed in parallel.

9. The optical waveguide according to claim 1, wherein a thickness of each of the transflective films is inversely proportional to its transmittance.

10. The optical waveguide according to claim 1, wherein each of the transflective films is made of a fluoride material.

11. The optical waveguide according to claim 10, wherein each of the transflective films is made of two materials of magnesium fluoride and lanthanum fluoride.

12. An optical device, comprising:
    a display source; and
    an optical waveguide comprising:
        a first total reflection surface and a second total reflection surface, disposed opposite to each other;
        at least two transflective films, disposed between the first total reflection surface and the second total reflection surface, each of the transflective films forming an angle with the first total reflection surface, and each of the transflective films forming an angle with the second total reflection surface;
        a first phase retardation film, disposed on an inner surface of the first total reflection surface between two adjacent transflective films; and
        a second phase retardation film, disposed on an inner surface of the second total reflection surface between the two adjacent transflective films;
        wherein each of the transflective films is configured to completely transmit light having a first polarization state, half transmit and half reflect light having a second polarization state, so that reflected light having the second polarization state propagates through the second phase retardation film and the second total reflection surface toward a target;
        wherein the optical waveguide is configured to convert light having the second polarization state to light having the first polarization state after the light having the second polarization state is totally reflected by the first phase retardation film and the first total reflection surface, and to convert light having the first polarization state to light having the second polarization state after the light having the first polarization state is totally reflected by the second phase retardation film and the second total reflection surface;
        wherein each of the light having the first polarization state and the light having the second polarization state is linearly polarized light; and
        wherein a polarization direction of the light having the first polarization state is perpendicular to a polarization direction of the light having the second polarization state.

13. The optical device according to claim 12, wherein along a light transmission direction of the optical waveguide, transmittances of the at least two transflective films for the light having the second polarization state decrease sequentially, and reflectances of the at least two transflective films for the light having the second polarization state increase sequentially.

14. The optical device according to claim 12, wherein each of the phase retardation films is a quarter wave plate, an angle between an optical axis of the quarter wave plate and the polarization direction of the light having the first polarization state is 45°, and an angle between the optical axis of the quarter wave plate and the polarization direction of the light having the second polarization state is 45°.

15. The optical device according to claim 12, wherein the optical waveguide has a thickness of 1.6 nm to 2.5 nm.

16. The optical device according to claim 12, wherein the angle between each of the transflective films and the first total reflection surface is in a range of 25° to 35°; and the angle between each of the transflective films and the second total reflection surface is in a range of 25° to 35°.

17. The optical device according to claim 12, wherein a distance between center points of the two adjacent transflective films is 2.2 nm to 5.5 nm.

18. The optical device according to claim 12, wherein in the two adjacent transflective films, a first transflective film intersects the first total reflection surface at a first intersection line, and a second transflective film intersects the second total reflection surface at a second intersection line, and an orthogonal projection of the first intersection line on the second total reflection surface overlaps wholly with the second intersection line.

19. The optical device according to claim 12, wherein the at least two transflective films are disposed in parallel.

20. The optical device according to claim 12, wherein a thickness of each of the transflective films is inversely proportional to its transmittance.

* * * * *